United States Patent [19]

Katayama

[11] Patent Number: 4,873,418

[45] Date of Patent: Oct. 10, 1989

[54] COMPOUND MACHINING APPARATUS

[75] Inventor: Isao Katayama, Kagamihara, Japan

[73] Assignee: Murata Kikai Kabushiki Kaisha, Kyoto, Japan

[21] Appl. No.: 310,911

[22] Filed: Feb. 16, 1989

Related U.S. Application Data

[63] Continuation-in-part of Ser. No. 239,218, Aug. 31, 1988, Pat. No. 4,833,292.

[30] Foreign Application Priority Data

Sep. 3, 1987 [JP] Japan ............................. 62-134893

[51] Int. Cl.$^4$ ............................................. B23K 26/00
[52] U.S. Cl. ............................. 219/121.6; 219/121.67; 219/121.82
[58] Field of Search ...................... 219/121.78, 121.67, 219/121.72, 121.6, 121.85, 121.82

[56] References Cited

U.S. PATENT DOCUMENTS 4,201,905  5/1980  Clark et al. ................. 219/121.67 X
4,335,296  6/1982  Bredow ......................... 219/121.7 X Primary Examiner—C. L. Albritton
Attorney, Agent, or Firm—Spensley Horn Jubas & Lubitz

[57] ABSTRACT

A compound machining apparatus in which a punch press and a movable table device are provided on separate frames, respectively, and a laser oscillator, a laser beam machining head and a tube for guiding a laser beam from the laser oscillator to the laser beam machining head are collectively placed on the same frame as the frame of the movable table device.

11 Claims, 4 Drawing Sheets

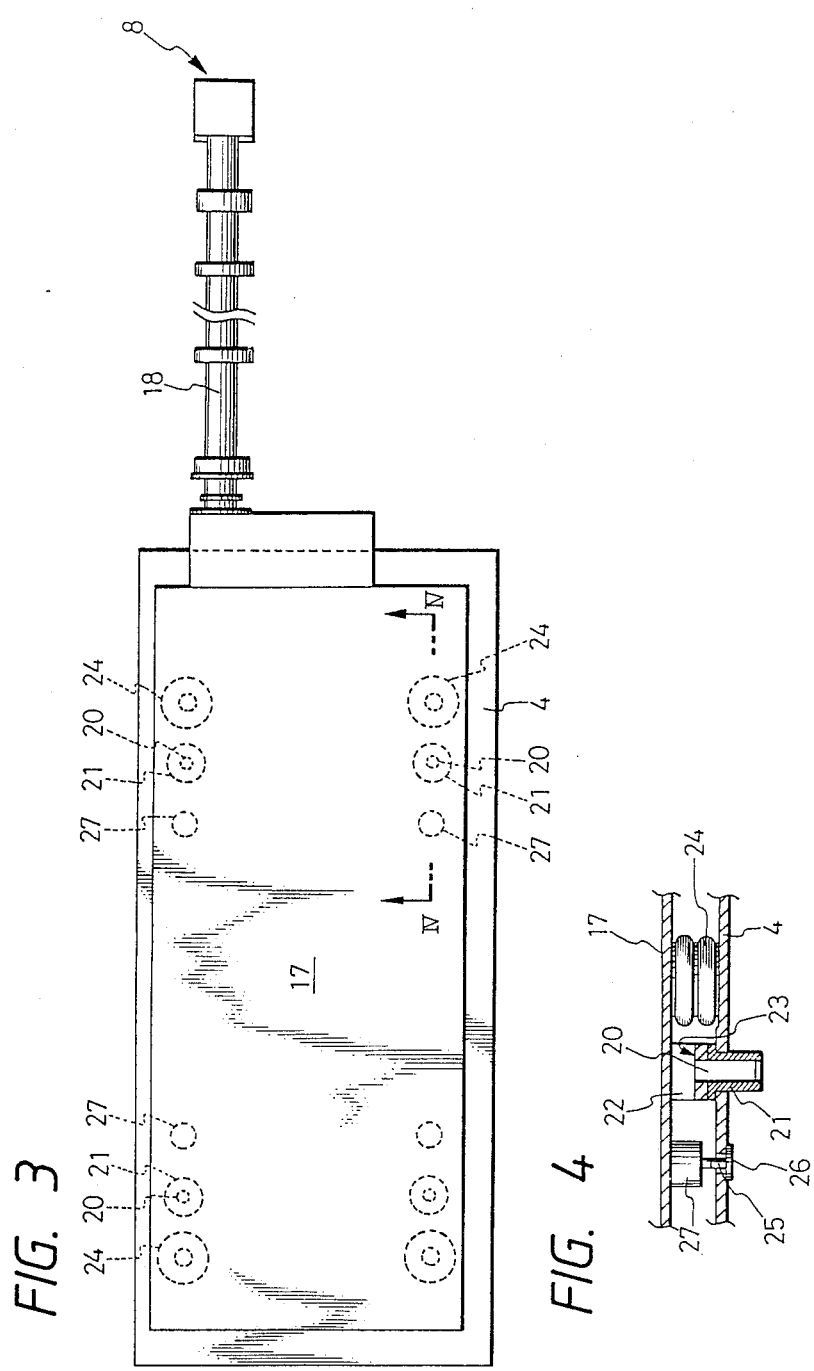

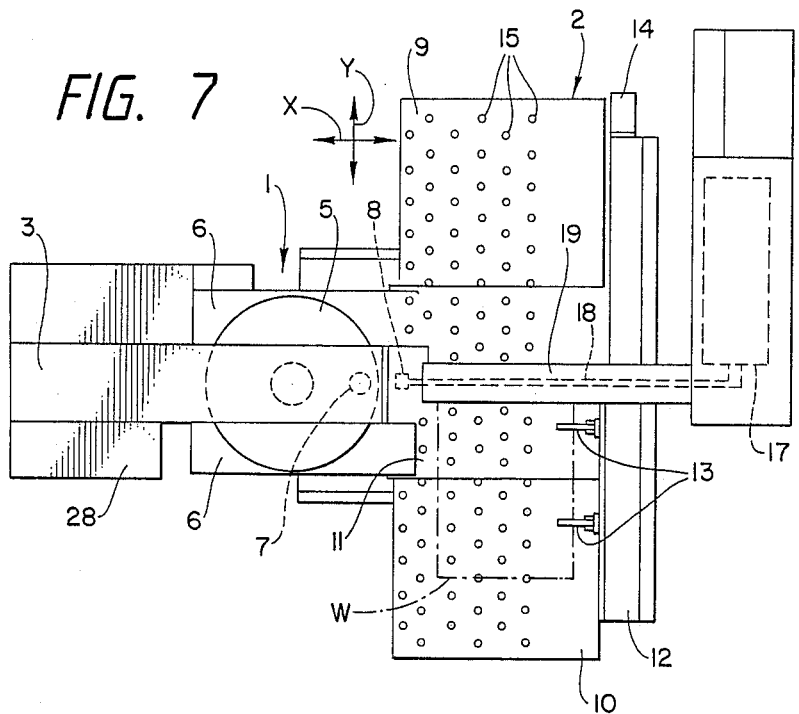
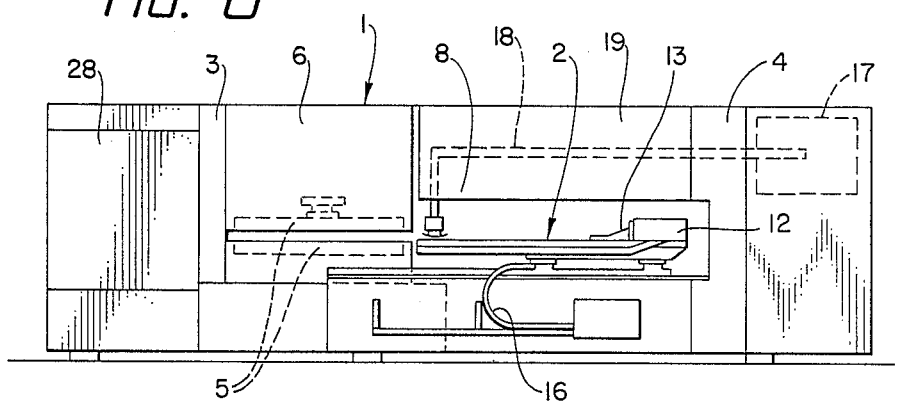

COMPOUND MACHINING APPARATUS

This application is a continuation-in-part of application Ser. No. 07/239,218, filed August 31, 1988 U.S. Pat. No. 4,833,292.

BACKGROUND OF THE INVENTION

1. Field of the Invention:

The present invention relates to a compound machining apparatus for performing a laser beam machining operation.

2. Description of the Related Art:

In the past, in a compound machining apparatus for performing a punch machining and a laser beam machining, a laser oscillator has been supported resiliently on the frame because vibrations during working caused by the punch machining head are transmitted to the laser oscillator to give rise to a deviation in optical axis and a trouble of the oscillator. More specifically, a linear bearing, an air spring and the like are interposed between the frame and the laser oscillator.

In the type as described above, the resilient members are provided between the frame and the laser oscillator to damp the ,shock during punching. However, if the punching machine and the laser oscillator are placed on one and the same frame, strong shocks are inevitably transmitted to the laser oscillator when a thick work is punched. In view of this, if the laser oscillator is entirely independently and separately installed in order to avoid the strong shock, a laser optical system such as a tube for guiding a laser beam from a laser oscillator to a laser beam machining head need be finely adjusted, resulting in an extremely difficult work.

SUMMARY OF THE INVENTION

It is an object of the present invention to provide a compound machining apparatus which is constructed such that a strong shock is not transmitted to a laser oscillator when a work is punched.

According to the present invention, the punch press and the movable table device are provided on separate frames, respectively, and the laser oscillator, the laser beam machining head and the tube for guiding a laser beam from the laser oscillator to the laser beam machining head are collectively placed on the same frame as the frame of the movable table device.

BRIEF DESCRIPTION OF THE DRAWINGS

The detailed description of the invention will be made with referenced to the accompanying drawings, wherein like numerals designate corresponding parts in the several Figures.

FIG. 3 plan view of a laser oscillator;

FIG. 4 is a sectional view taken on line IV—IV of FIG. 3;

FIG. 7 is a plan view of a compound machining apparat to another embodiment of the present invention; and FIG. 8 is a side view of the apparatus of FIG. 1.

DETAILED DESCRIPTION

The following detailed description is of the best presently contemplated mode of carrying out the invention. This description is not to be taken in a limiting sense, but is made merely for the purpose of illustrating the general principles of the invention. The scope of the invention is best defined by the appended claims.

An embodiment will be described hereinafter with reference to the drawings.

Figure 1:
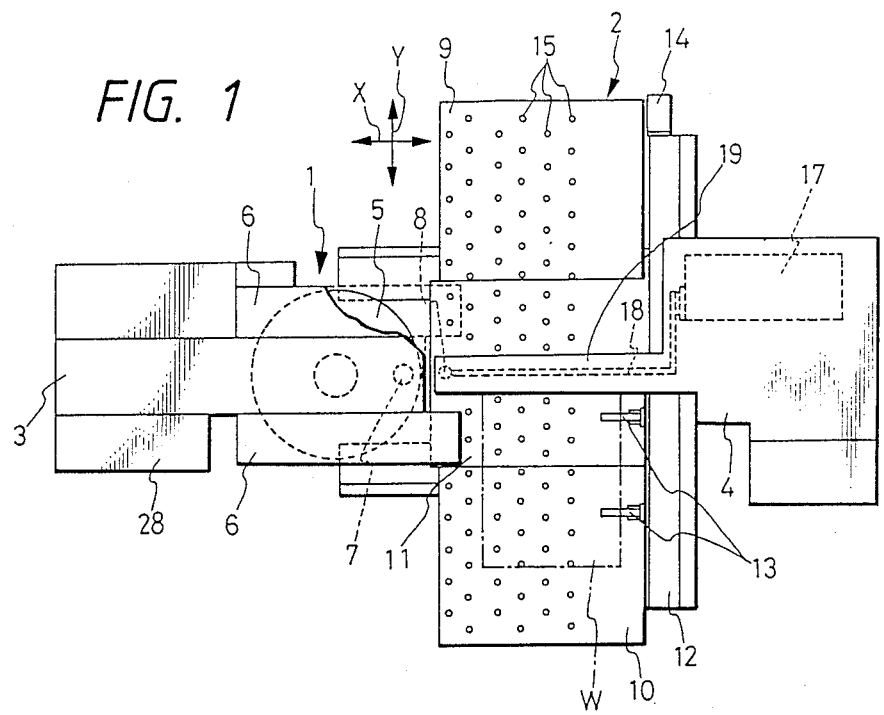
FIG. 1 is a plan view of a compound machining apparatus according to an embodiment of the present invention.
Figure 2:
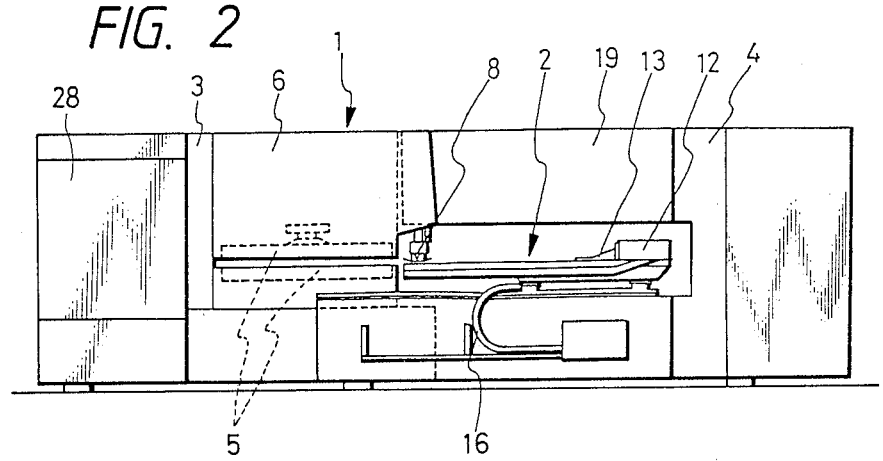
FIG. 2 is a side view of the apparatus of FIG. 1.
Figure 5:
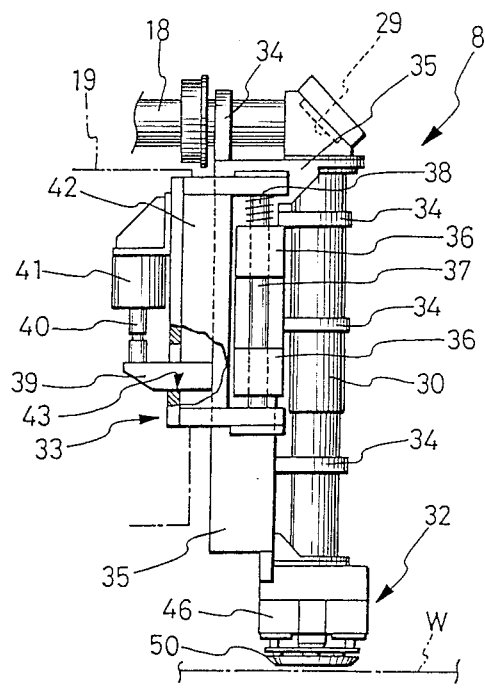
FIG. 5 an enlarged view of a laser machining head.
Figure 6:
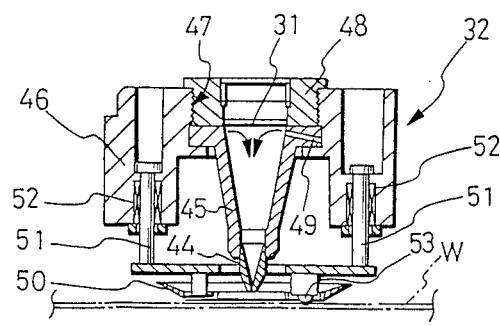
FIG. 6 is a longitudinal sectional side view of the lower end of the machining head of FIG. 5.

FIGS. 1 and 2 are a plan view and a side view, respectively, of a compound machining apparatus according to an embodiment of the present invention and FIGS. 7 and 8 are a plan view and a side view, respectively, of a compound machining apparatus according to another embodiment. Frames 3 and 4 for a punch press 1 and a movable table device 2, respectively, are mounted opposedly to each other. Both the frames 3 and 4 are close to each other but are separated from each other so as not to transmit vibrations resulting therefrom to either frame.

The punch press 1 is composed of the frame 3, a number of punches mounted within the frame 3, a pair of upper and lower turrets 5 each having a die received therein, a cover 6 for the turret, and a numerical control device 28. Numeral 7 denotes a punch machining head.

The movable device 2 movably supports a work sheet W within a plane to bring a suitable position of the work sheet W to a position of the punch machining head 7 and to that of a laser beam machining head 8.

More specifically, the movable table device 2 is composed of left and right tables 9 and 10 movable in a direction of X in the figures, a fixed table 11 between the left and right tables 9 and 10, a carriage 12 moving in a direction of X integral with the left and right tables 9 and 10, and a work holder 13 provided on the carriage 12 and moving in a direction of X in the figures. Numeral 14 denotes a motor for moving the work holder 13 through a ball thread not shown. The work sheet W is held at one side by the work holder 13 and moved laterally and vertically on the tables 9, 10 and 11. Numeral 15 denotes a rolling ball to provide a smooth movement of the work sheet W on the tables 9 and 10, and numeral 16 denotes a cable duct for feeding an electricity, a signal and the like to the movable table device 2.

A laser oscillator 17 is placed on the same frame 4 as that of the movable table device 2 so that a laser beam issued from the laser oscillator 17 passes through a guide tube 18, reaches the laser beam machining head 8 provided in the vicinity of the punch machining head 7, and is condensed by a lens 31, after which it is irradiated on the work sheet W. A laser frame 19 supporting the laser beam machining head 8 and housing therein the guide tube 18 is not at all in contact with the frame 3 of the punch press 1. The laser beam machining head 8 and the punch machining head 7 are arranged on the same line in the direction of Y.

Next, a method of mounting the laser oscillator 17 to the frame 4 of the movable table device 2 will described.

That is, four shafts 20 are projectingly provided from the lower surface of the laser oscillator 2 toward vertical and downward portion, the shafts 20 being inserted into linear bearings 21 provided on the frame 4 and supported movably up and down, and a flange portion 22 at the end of the shaft 20 and an upper end surface 23 of the linear bearing 21 are worked into an accurate plane so that when both the elements 22 and 23 are placed in close contact, the laser oscillator 17 assumes an accurate horizontal attitude.

On the side of the shaft 20 are provided an air spring 24 which is expanded by feed and discharge of air between the bottom surface of the laser oscillator 17 and the frame 4 and a fluid cylinder 27 formed with a flange portion 26 at the end of a rod 25 extending through the frame 4 so that when the fluid cylinder 27 is extended and pressure air is supplied from a source of air not shown to the air spring 24, the air spring 24 is expanded to resiliently raise the laser oscillator 17 to move the flange portion 22 at the end of the shaft 20 away from the upper surface 23 of the linear bearing 21, whereas when air is exhausted from the air spring 24 to shorten the latter and the fluid cylinder 27 is contracted, the flange portion 26 at the end of the rod 25 comes into strong engagement with the lower surface of the frame 4 to lock the laser oscillator 17 to a fixed position with respect to the frame 4.

As described above, the laser oscillator 17 is mounted on the frame 4 by means of the linear bearing 21, the air spring 24 and the like, and therefore, the vibration of the movable table device 2 is not transmitted to the laser oscillator 17.

In the embodiment of FIGS. 1 and 2, the laser oscillator 17 is arranged with its longest side substantially parallel to the direction X. In the embodiment of FIGS. 7 and 8, however, the laser oscillator 17 and the casing of the laser oscillator 17 are arranged with their longest sides substantially parallel to the direction Y, perpendicular to the movement of the tables 9 and 10. In the embodiments of FIGS. 7 and 8, the arrangement of the laser oscillator 17, substantially parallel to the direction Y, reduces the space requirement of the compound machining apparatus. Thus, the apparatus shown in FIGS. 7 and 8 can operate in a relatively small space or area.

Next, the laser beam machining head 8 will be described.

The laser beam machining head 8 is composed of a vertical guide tube 30 for vertically guiding a laser beam refracted at right angles and downwardly by a mirror 29 provided on the front end of the guide tube 19, a focusing device 32 retaining a lens 31 at the lower end of the vertical guide tube 30, and a supporting device 33 for vertically movably supporting front portions of the focusing device 32, vertical guide tube 30 and guide tube 18.

The supporting device 33 is composed of a support frame 35 secured and connected at 34 to both the guide tubes 18 and 30, a guide shaft 37 vertically extending through a sleeve 36 projected from the support frame 35 sideways, a spring 38 retained on the upper end of the guide shaft 37 to gently and downwardly urge the support frame 35, and a support frame raising air cylinder 41 with a rod 40 thereof connected to a block portion 39 projected from the back of the support frame 35, so that a downward component obtained by adding the bias of the spring 38 to the own weight of the vertical guide tube 30 and the focusing device 32 is balanced with an upward component caused by the air cylinder 41 to resiliently support both the guide tubes 18 and 30 and the focusing device 32 in a space. Numeral 42 designates a bracket for securing the guide shaft 37 to the laser frame 19, and a body of the air cylinder 41 is secured to the back of the bracket 42.

Numeral 43 denotes a vertical slot bored in the back plate of the bracket 42. The block portion 39 rearwardly extends through the slot 43, the lower surface of the block portion 39 and the bottom of the slot 43 being worked into a precise contact surface so that when the air cylinder 41 is contracted, the aforesaid two contact surfaces are separated and the guide tubes 18 and 30 and the focusing device 32 are resiliently supported in the space as previously mentioned, whereas when the air cylinder 41 is extended, the two contact surfaces come into close contact with each other and the guide tubes 18 and 30 and the focusing device 32 can be positioned to a fixed position with respect to the laser frame 19.

Next, the focusing device 32 will be described.

A large diameter tapped hole 47 is formed in a block 46 having a nozzle 44 at the lowermost end of the machining head 8 and a nozzle holder 45 adjustably secured thereto, and a lens holder 48 with a lens 31 fitted herein is threadedly mounted within the tapped hole 47, whereby when the lens 31 is cleaned or checked, such work can be done by removing the lens holder from the top without removing the nozzle 44 and the nozzle holder 45. Numeral 49 denotes as assist gas introducing hole formed in the flange portion of the nozzle holder 45, the hole 49 being opened toward the obliquely and upwardly located lens 31 surface, and when the gas is introduced, the gas once impinges upon the lens 31 surface and is injected from the nozzle 44 to the work sheet W surface. Numeral 50 denotes a contact plate to the work sheet W surface connected movably up and down by means of a bearing 52, and numeral 53 denotes a ball which rolls into contact with the work sheet W surface.

As will be apparent from the foregoing, in the compound machining apparatus according to the present invention, the punch press and the laser oscillator are provided on the separate frames, respectively, and therefore, even when the thick plate is punched, a strong shock is not transmitted to the laser oscillator. Furthermore, since the laser beam machining head as well as the laser beam guide tube are placed on the same frame as that of the movable table device, cumbersome work such as fine adjustment when the laser optical system such as the laser beam guide tube, the laser beam machining head and the like are installed are not at all necessary.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A compound machining apparatus comprising a punch press, a laser oscillator having a long side and a movable table device having a table movable in a first direction, characterized in that the punch press and the movable table device are provided on separate frames, respectively, and the laser oscillator, a laser beam machining head and a guide tube for guiding a laser beam from the laser oscillator to the laser beam machining head are collectively placed on the same frame as the frame of said movable table device, wherein the long side of the laser oscillator is arranged substantially perpendicular to the first direction.

2. The compound machining apparatus as claimed in claim 1, wherein said movable table device movably supports a plate within a plane to bring a suitable position of the plate to a position of a punch machining head and to that of a laser beam machining head, and is composed of two tables movable in a direction toward the punch press, a fixed table between the two movable tables, a carriage moving integral with the movable tables, and a work holder for holding a work sheet which is provided on the carriage and moving in a direction rectangular to the moving direction of the carriage.

3. The compound machining apparatus as claimed in claim 2, wherein said laser beam machining head and said punch machining head are arranged on the same line in one of moving directions of the work sheet.

4. The compound machining apparatus as claimed in claim 1, wherein said laser oscillator is mounted to the frame of the movable table device by means of a plurality of shafts projectingly provided from the lower surface of the laser oscillator toward vertical and downward portion, linear bearings provided on the frame and supporting movably.,up and down the shafts which are inserted thereinto, an air spring which is expanded by feed and discharge of air between the bottom surface of the laser oscillator and the frame, and a fluid cylinder formed with a flange portion at the end of a rod extending through the frame and provided between the bottom surface of the laser oscillator and the frame.

5. The compound machining apparatus as claimed in claim 4, wherein a flange portion is formed at the end of said shaft so that when the flange portion and in upper surface of the linear bearings are placed in close contact, the laser oscillator assumes an accurate horizontal attitude.

6. The compound machining apparatus as claimed in claim 1, wherein said laser beam machining head is mounted at the end portion of a laser frame extending from the frame supporting the laser oscillator toward the punch press and having the guide tube for guiding the laser beam, and comprises a vertical guide tub for vertically guiding a laser beam reflected by a mirror provided on the front end of the guide tube, a focusing device retaining a lens at the lower end of the vertical guide tube, and a supporting device for vertically movably supporting front portions of the focusing device, vertical guide tube and guide tube.

7. The compound machining apparatus as claimed in claim 6, wherein a lens holder with a lens fitted therein is threadedly mounted within a tapped hole which is formed in a block having a nozzle at the lowermost end of the machining head so that the lens is cleaned and checked by removing the lens holder from the top of the block.

8. A compound machining apparatus operable with a punch press, a laser oscillator having a long side and a movable table device having a table which is movable in a first direction, said apparatus comprising:
a first frame for supporting the punch press; and
a second frame, independent of said first frame, for supporting the laser oscillator and the movable table device, said second frame adapted to support the laser oscillator with the long side of the laser oscillator arranged substantially perpendicular to the first direction.

9. A compound machining apparatus as claimed in claim 8, further comprising:
a laser beam machining head supported by said second frame;
a guide tube for guiding a laser beam from the laser oscillator to the laser beam machining head, said guide tube being supported by said second frame.

10. A compound machining apparatus as claimed in claim 8, wherein the laser oscillator is provided within a casing having a long side and said second frame is adapted to support the casing with the long side or the casing arranged substantially perpendicular to the first direction.

11. A compound machining apparatus as claimed in claim 9, wherein the laser oscillator is provided within a casing having a long side and said second frame is adapted to support the casing with the long side of the casing arranged substantially perpendicular to the first direction.

* * * * *